(12) United States Patent
Cabral et al.

(10) Patent No.: US 10,255,002 B2
(45) Date of Patent: Apr. 9, 2019

(54) UTILIZING FAST MEMORY DEVICES TO OPTIMIZE DIFFERENT FUNCTIONS

(71) Applicant: International Business Machines Corporation, Armonk, NY (US)

(72) Inventors: Bruno Hennig Cabral, Chicago, IL (US); Joseph M. Kaczmarek, Chicago, IL (US); Ravi V. Khadiwala, Bartlett, IL (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 15/362,615

(22) Filed: Nov. 28, 2016

(65) Prior Publication Data

US 2017/0153942 A1    Jun. 1, 2017

Related U.S. Application Data

(60) Provisional application No. 62/260,735, filed on Nov. 30, 2015.

(51) Int. Cl.
*G06F 11/00* (2006.01)
*G06F 3/06* (2006.01)
(Continued)

(52) U.S. Cl.
CPC ............ *G06F 3/067* (2013.01); *G06F 3/064* (2013.01); *G06F 3/0619* (2013.01);
(Continued)

(58) Field of Classification Search
CPC ............ G06F 17/30; G06F 17/30067; G06F 17/30283; G06F 17/30289; G06F 3/067;
(Continued)

(56) References Cited

U.S. PATENT DOCUMENTS

| 4,092,732 A | 5/1978 | Ouchi |
| 5,454,101 A | 9/1995 | MacKay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Michael Maskulinski
(74) *Attorney, Agent, or Firm* — Garlick & Markison; Timothy W. Markison; Shayne X. Short

(57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. A computing device receives a data access request for an encoded data slice (EDS) associated with a data object. The computing device compares a slice name of the data access request with slice names stored within RAM. When the data access request slice name compares unfavorably with those stored slice names, the computing device transmits an empty data access response that includes no EDS to the other computing device without needing to access a hard disk drive (HDD) that stores EDSs. Alternatively, the computing device transmits a data access response that includes the EDS.

20 Claims, 8 Drawing Sheets

(51) Int. Cl.

| | | |
|---|---|---|
| *G06F 11/14* | (2006.01) | |
| *G06F 11/10* | (2006.01) | |
| *H03M 13/15* | (2006.01) | |
| *G06F 9/48* | (2006.01) | |
| *G06F 9/50* | (2006.01) | |
| *G06F 12/0866* | (2016.01) | |
| *G06F 12/0891* | (2016.01) | |
| *G06F 15/173* | (2006.01) | |
| *H03M 13/00* | (2006.01) | |
| *H04L 29/06* | (2006.01) | |
| *H04L 29/12* | (2006.01) | |

(52) U.S. Cl.
CPC .......... *G06F 3/0629* (2013.01); *G06F 3/0644* (2013.01); *G06F 3/0665* (2013.01); *G06F 3/0689* (2013.01); *G06F 9/4881* (2013.01); *G06F 9/5083* (2013.01); *G06F 11/1076* (2013.01); *G06F 11/1092* (2013.01); *G06F 11/1402* (2013.01); *G06F 11/1464* (2013.01); *G06F 12/0866* (2013.01); *G06F 12/0891* (2013.01); *G06F 15/17331* (2013.01); *H03M 13/1515* (2013.01); *G06F 2201/84* (2013.01); *G06F 2211/1007* (2013.01); *G06F 2212/1024* (2013.01); *G06F 2212/154* (2013.01); *G06F 2212/263* (2013.01); *G06F 2212/403* (2013.01); *H03M 13/616* (2013.01); *H03M 13/6502* (2013.01); *H04L 61/1582* (2013.01); *H04L 61/6004* (2013.01); *H04L 63/101* (2013.01)

(58) Field of Classification Search
CPC ...... G06F 3/064; G06F 3/0644; G06F 3/0689; G06F 12/0866; G06F 12/0891; G06F 11/1076; G06F 11/1092; G06F 11/1402; G06F 11/1464

See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 10,078,468 B2 * | 9/2018 | Ober ................. G06F 3/067 |
| 10,108,484 B2 * | 10/2018 | Kazi ................. G06F 3/0619 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2008/0027946 A1 * | 1/2008 | Fitzgerald ......... G06F 17/30067 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0055170 A1 * | 3/2011 | Mark ................. G06F 17/30067 707/691 |
| 2013/0031349 A1 | 1/2013 | Grube et al. |
| 2013/0304746 A1 * | 11/2013 | Dhuse ................. G06F 17/30625 707/743 |
| 2014/0351457 A1 * | 11/2014 | Baptist ................. G06F 3/0659 710/5 |
| 2016/0210058 A1 | 7/2016 | Kirshenbaum et al. |
| 2017/0006099 A1 | 1/2017 | Kazi et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

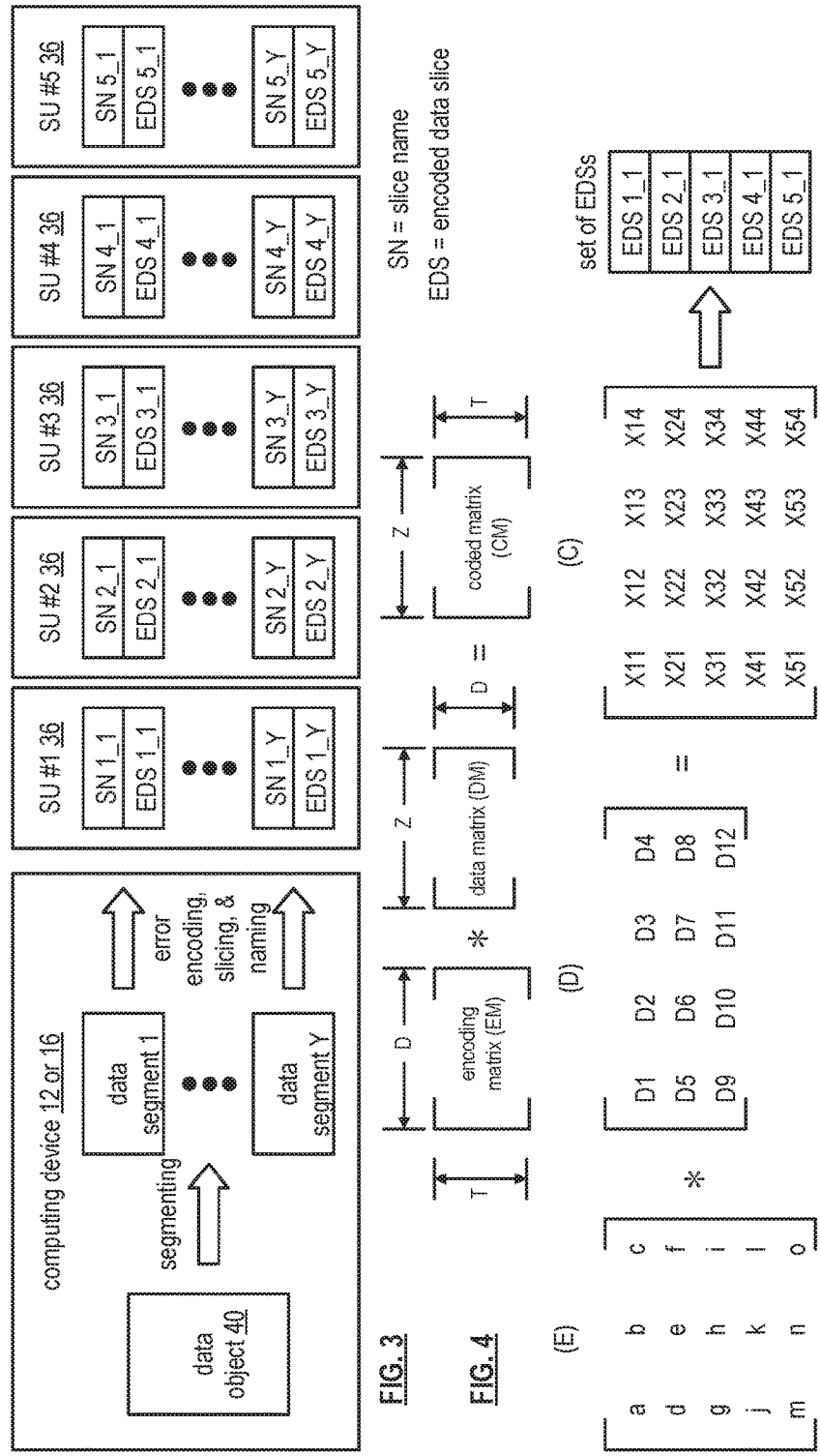

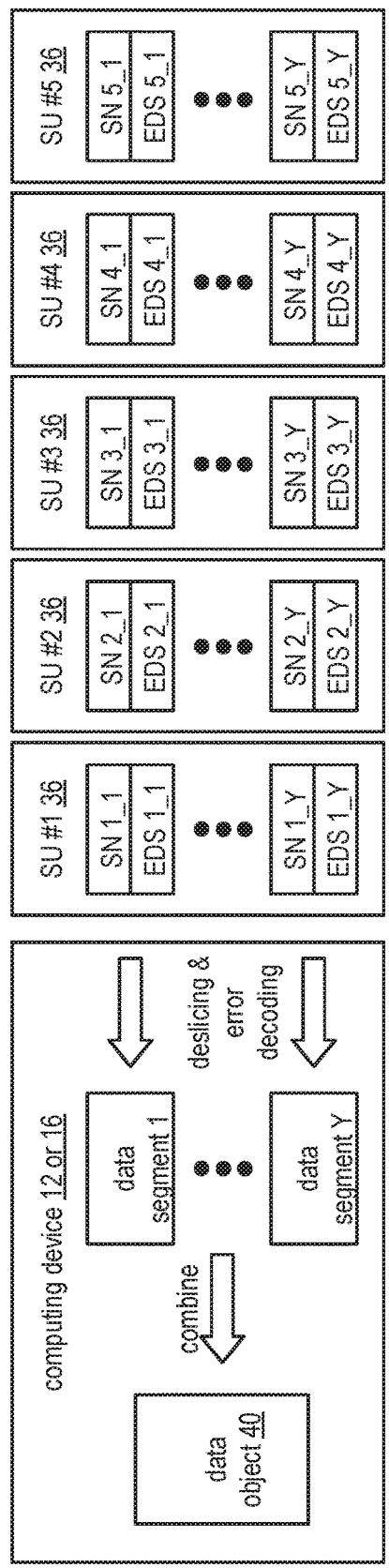

UTILIZING FAST MEMORY DEVICES TO OPTIMIZE DIFFERENT FUNCTIONS

CROSS REFERENCE TO RELATED PATENTS

The present U.S. Utility Patent Application claims priority pursuant to 35 U.S.C. § 119(e) to U.S. Provisional Application No. 62/260,735, entitled "ACCESSING COPIES OF DATA STORED IN A DISPERSED STORAGE NETWORK," filed Nov. 30, 2015, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems do not efficiently service all types of data access requests, data checks, and data status checks. For example, the response time of such communications between devices may be prohibitive in some data storage systems and based on some conditions.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
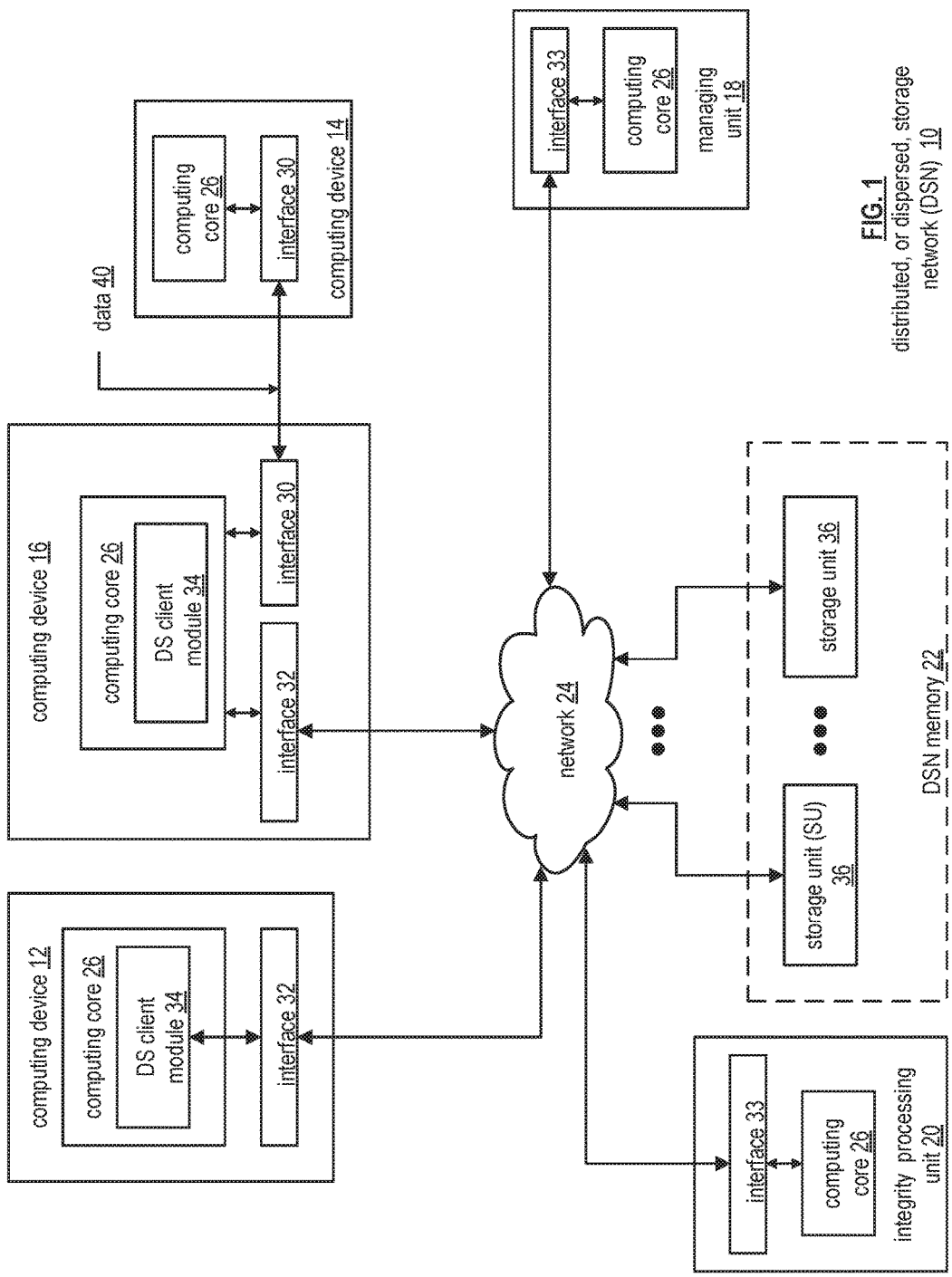
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
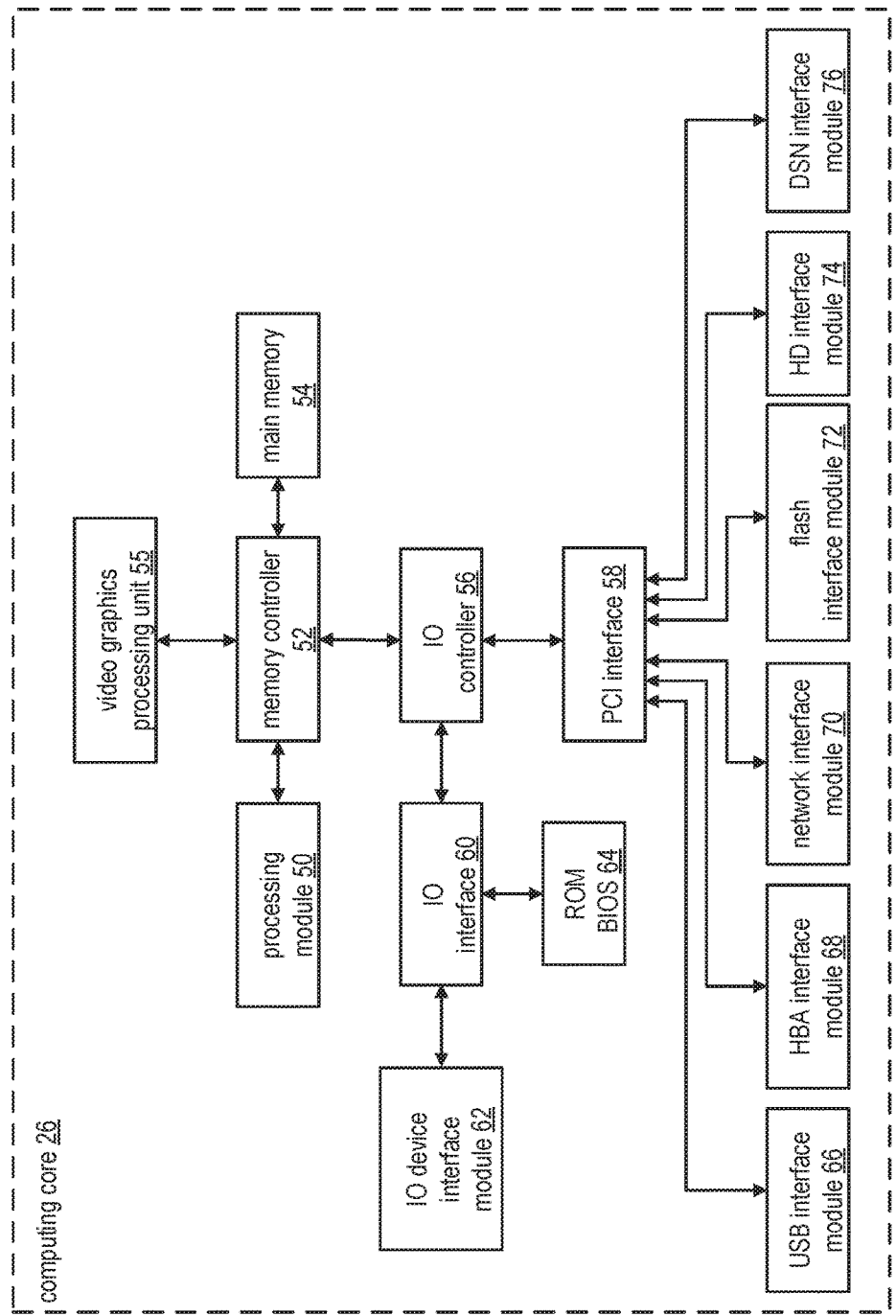
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/ or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the USN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon. Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.), In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1–T), a data segment number (e.g., one of 1–Y), a vault identifier (ID), a data object identifier (ID), and may further include revision level information of the encoded data slices. The slice name functions as, at least part of, a USN address for the encoded. data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
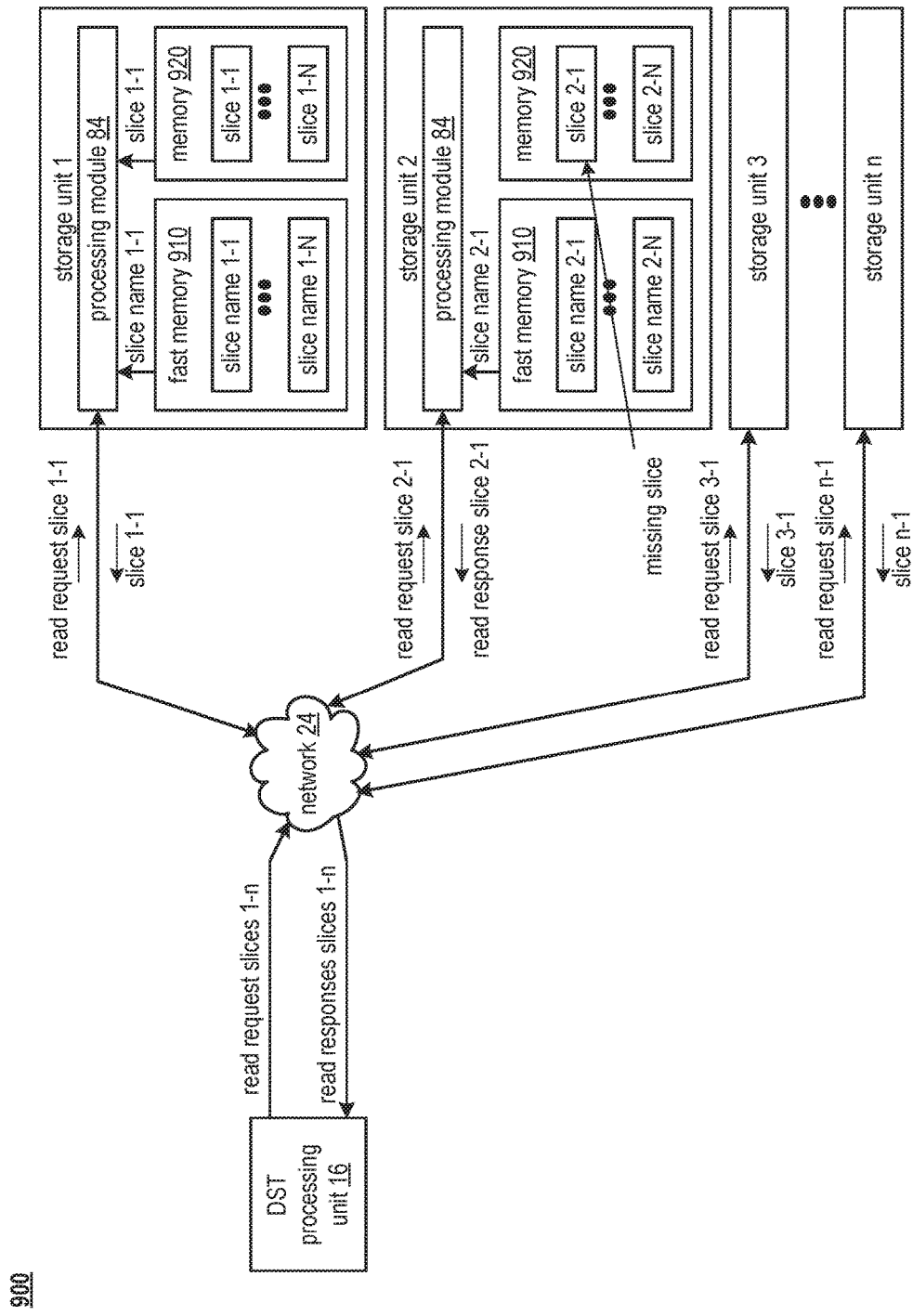
FIG. 9 is a schematic block diagram of another embodiment of a dispersed storage network (DSN) in accordance with the present invention.

FIG. 9 is a schematic block diagram of another embodiment 900 of a dispersed storage network (DSN) that includes the distributed storage and task (DST) processing unit 16, the network 24 of FIG. 1, and a set of storage units 1-*n* such as based on SUs 36 such as with respect to FIG. 3 or FIG. 7. Each storage unit includes a processing module and/or computing core 26, a fast memory 910, and a memory 920. The memory 920 may be implemented utilizing the various types of memory such as a hard drive and/or hard disk drive (HDD). The fast memory 910 may be implemented utilizing the memory 920 with access characteristics that are faster than the memory 920 (e.g., solid-state memory, random access memory (RAM), and/or any other fast memory 910 device). Each storage unit may be implemented utilizing a DST execution unit that may be implemented utilizing the computing device 12, 14, 16, the managing unit 18, and/or the integrity processing unit 20 such as with respect to FIG. 1, a SU 36 such as with respect to FIG. 3 or FIG. 7, and/or any other device implemented within a DSN to perform operations associated with a DST execution unit. The DSN functions to retrieve the encoded data slice. In some examples, the fast memory 910 is characterized as substantially and/or approximately faster-responsive, faster-accessible, faster-operative, etc. memory than the memory 920. As a specific example, the fast memory 910 when implemented as solid state memory will be faster-responsive, faster-accessible, faster-operative, etc. memory than the memory 920 when implemented as a hard disk drive (HDD).

In an example of operation of the retrieving of the encoded data slice, the processing module 84 of the storage unit 1 accesses the fast memory 910 to determine whether a slice 1-1 is stored in the memory 920 when receiving a read request for slice 1-1, where data has been dispersed storage error encoded to produce a plurality of N sets of encoded data slices 1-$n$ for storage in the memories of the storage units, where the DST processing unit 16 sends, via the network 24, a set of read slice requests 1-$n$ that includes the read request for slice 1-1. The determining includes at least one of accessing a slice name and status list in the fast memory 910, interpreting the list, and indicating whether the slice is stored in the memory 920 based on the interpretation of the list. For example, the processing module 84 indicates that the slice 1-1 is available for retrieval when the retrieved list from the fast memory 910 indicates that the slice 1-1 is stored in the memory 920. When the requested slice is stored in the memory 920, the processing module 84 of the storage unit 1 sends, via the network 24, the requested slice 1-1 to the DST processing unit 16 as a read response of a set of read responses for slices 1-$n$.

Figure 10:
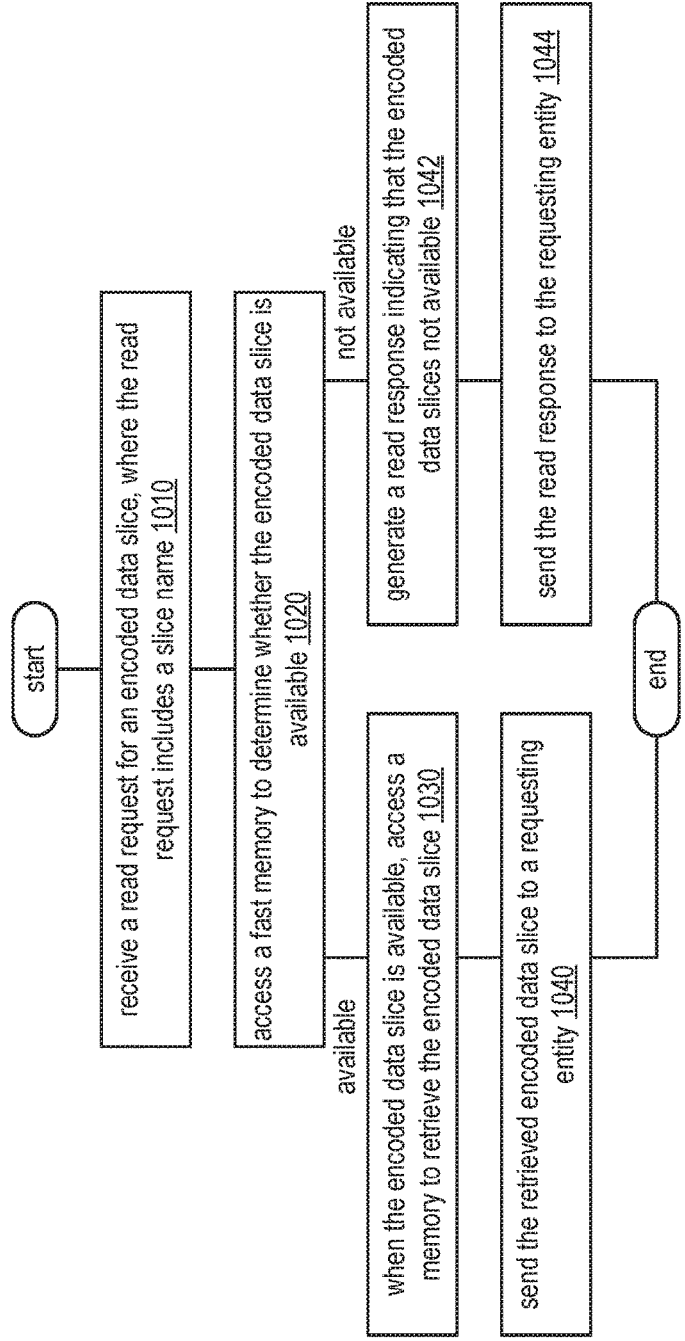
FIG. 10 is a flowchart illustrating an example of retrieving an encoded data slice in accordance with the present invention.

The processing module 84 of the storage unit 2 accesses the fast memory 910 of the storage unit 2 to determine whether a slice 2-1 is stored in the memory 920 of the storage unit 2 when receiving a read request for slice 2-1. The determining includes at least one of accessing a slice name and status list in from fast memory 910 of the storage unit 2, interpreting the list, and indicating whether the slice is stored in the memory 920 of the storage unit 2 based on the interpretation of the list. For example, the processing module 84 of the storage unit 2 indicates that the slice 2-1 is not available for retrieval when the retrieved list from the fast memory of the storage unit 2 indicates that the slice 2-1 is not stored in the memory 920. When the requested slice is not stored in the memory 920, the processing module 80 for the storage unit 2 sends, via the network 24, a read response for slice 2-1 to the DST processing unit 16, where the response indicates that the requested slice 2-1 is not available, FIG. 10 is a flowchart illustrating an example of retrieving an encoded data slice. The method 1000 includes a step 1010 where a processing module (e.g., of a storage unit) receives a read request for an encoded data slice, where the read request includes one or more of a slice name a revision level, a memory identifier, a fast memory identifier, a memory address, and a fast memory address. The method 1000 continues at the step 1020 where the processing module accesses a fast memory to determine whether the encoded data slice is available. For example, the processing module accesses a slice name and status list within the fast memory, interprets the slice name and status list, and indicates that the requested encoded data slice is available when the interpretation indicates that the encoded data slice is stored in a memory (e.g., another memory). The method 1000 branches to the step 1042 where the processing module generates a read response indicating that the encoded data slices not available when the encoded data slices not available. The method 1000 continues to the next step 1044 where the processing module accesses a memory to retrieve the encoded data slice when the encoded data slice is available.

When the encoded data slice is available, the method 1000 continues at the step 1030 where the processing module accesses a memory to retrieve encoded data slice. For example, the processing module identifies a memory device, identifies an address of the identified memory device, and accesses the identified memory device at the identified at address to retrieve encoded data slice. The method 1000 continues at the step 1040 where the processing module sends the retrieved encoded data slice to a requesting entity.

When the encoded data slice is not available, the method 1000 continues at the step 1042 where the processing module generates a read response indicating that the encoded data slice is not available. The generating includes producing the response to include one or more of the slice name, a revision level, and an indicator that the slices not available. The method 1000 continues at the step 1044 where the processing module sends the read response to the requesting entity.

Figure 11A:
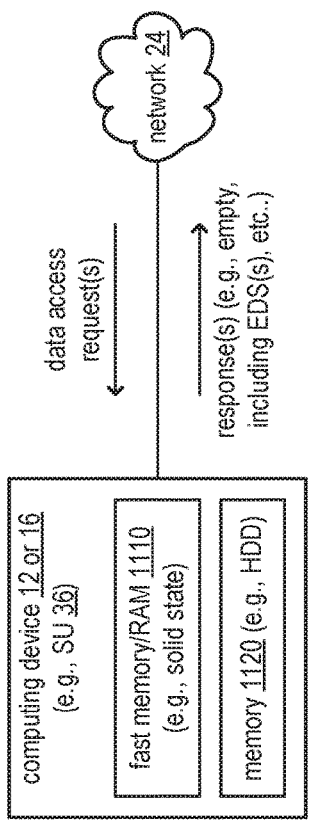
FIG. 11A is a schematic block diagram of an example of separately provisioned memories within a computing device for different purposes in accordance with the present invention.

FIG. 11A is a schematic block diagram of an example 1101 of separately provisioned memories within a computing device for different purposes in accordance with the present invention. A computing device 12 or 16 include fast memory/random access memory (RAM) 1110 (e.g., such as solid state memory) and memory 1120 (e.g., a hard disk drive (HDD)). In general, the fast memory/RAM 1110 is any type of memory that is very quickly responsive and can be accessed very quickly as opposed to more conventional memory such as a HDD that is relatively more slowly responsive to accesses thereto, In an example of operation and implementation, a computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations.

For example, computing device 12 or 16 receives from another computing device a data access request for an encoded data slice (EDS) associated with a data object. Note that the data access request includes a data access request slice name for the EDS associated with the data object. Then, the computing device 12 or 16 compares the data access request slice name with a plurality of slice names stored within the RAM, wherein the plurality of slice names are respectively associated with a plurality of encoded data slices (EDSs) stored within the HDD.

When the data access request slice name compares unfavorably with the plurality of slice names, the computing device 12 or 16 transmits an empty data access response that includes no EDS to the other computing device. When the data access request slice name compares favorably with at least one of the plurality of slice names, the computing device 12 or 16 then transmits retrieves, from the HDD, an EDS of the plurality of EDSs having a corresponding slice name that compares favorably with the data access request slice name and transmits a data access response that includes the EDS of the plurality of EDSs having the corresponding slice name to the other computing device.

In some examples, note that the data object is segmented into a plurality of data segments, and a data segment of the plurality of data segments is dispersed error encoded in accordance with dispersed error encoding parameters to produce a set of encoded data slices (EDSs). Note that each EDS of the set of EDS having a respective slice name, and the set of EDSs are distributedly stored among a plurality of storage units (SUs) within the DSN. A decode threshold number of EDSs are needed to recover the data segment, a read threshold number of EDSs provides for reconstruction of the data segment, and a write threshold number of EDSs provides for a successful transfer of the set of EDSs from a first at least one location in the DSN to a second at least one location in the DSN.

Note that the computing device may be located at a first premises that is remotely located from at least one SU of the primary SUs or plurality of secondary SUs the within the DSN. Also, note that the computing device may be of any of a variety of types of devices as described herein and/or their equivalents including a SU of any group and/or set of SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

Figure 11B:
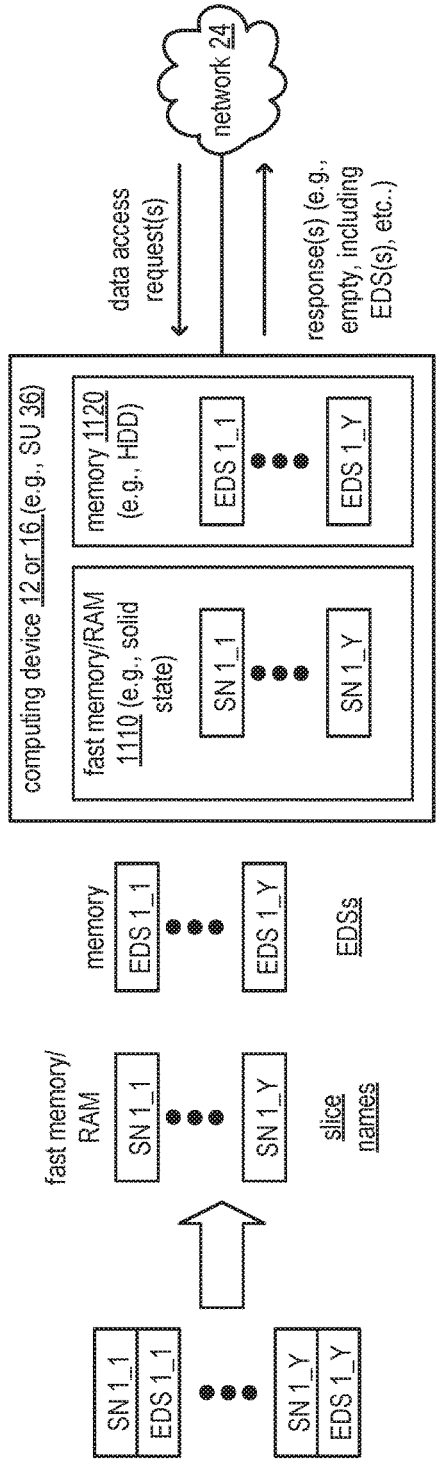
FIG. 11B is a schematic block diagram of another example of separately provisioned memories within a computing device for different purposes in accordance with the present invention.

FIG. 11B is a schematic block diagram of another example 1102 of separately provisioned memories within a computing device for different purposes in accordance with the present invention. The computing device 12 or 16 stores slice names e.g., SN 1_1 through SN 1_Y) in the fast memory/RAM 1110 (e.g., such as solid state memory) and stores encoded data slices (EDSs) (e.g., EDS 1_1 through EDS 1_Y) in the memory 1120 (e.g., a hard disk drive (HDD)). In general, any other desired identifiers may also be stored in the fast memory/RAM 1110

A computing device 12 or 16 include fast memory/random access memory (RAM) 1110 (e.g., such as solid state memory) and memory 1120 (e.g., a hard disk drive (HDD)). In general, the fast memory/RAM 1110 is any type of memory that is very quickly responsive and can be accessed very quickly as opposed to more conventional memory such as a HDD that is relatively more slowly responsive to accesses thereto.

In an example of operation and implementation, the computing device 12 or 16 compares a revision level for the EDS associated with the data object that is included within the data access request to a plurality of revision levels stored within the RAM. Note that the plurality of revision levels are associated respectively with the plurality of slice names stored within the RAM. When the data access request slice name compares unfavorably with the plurality of slice names and when the revision level for the EDS associated with the data object compares unfavorably with the plurality of revision levels, the computing device 12 or 16 transmits the empty data access response to the other computing device.

When the data access request slice name compares favorably with the plurality of slice names and when the revision level for the EDS associated with the data object compares unfavorably with the plurality of revision levels, the computing device 12 or 16 transmits the empty data access response to the other computing device. When the data access request slice name compares favorably with at least one of the plurality of slice names and when the revision level for the EDS associated with the data object compares favorably with at least one of the plurality of revision levels, then the computing device 12 or 16 retrieves, from the HDD, the EDS of the plurality of EDSs having the corresponding slice name that compares favorably with the data access request slice name and a corresponding revision level that compares favorably with the revision level for the EDS associated with the data object. The computing device 12 or 16 then transmits the data access response that includes the EDS of the plurality of EDSs having the corresponding slice name and the corresponding revision level that compares favorably with the revision level for the EDS associated with the data object to the other computing device.

In some examples, the data access request for the EDS associated with the data object is based on any one or more of a check request involving the EDS associated with the data object, a read request involving the EDS associated with the data object, a write request involving the EDS associated with the data object, a rebuild request involving the EDS associated with the data object, a rebuild scanning request involving the EDS associated with the data object, a reallocation request involving the EDS associated with the data object, a rebalancing request involving the EDS associated with the data object, a synchronization request between mirrored vault operations involving the EDS associated with the data object, and/or a trimmed write request involving the EDS associated with the data object based on fewer than all of a set of encoded data slices (EDSs) generated when the data object is segmented into a plurality of data segments and a data segment of the plurality of data segments is dispersed error encoded in accordance with dispersed error encoding parameters to produce the set of EDSs.

Note that different sets of trimmed copies of EDSs may be based on and include different EDSs therein. For example, a trimmed copy may be initially generated and included/stored in another set of SUs. Subsequently, such trimmed copy can be fully built out to include all of the EDSs of a set of EDSs in a set of SUs in which a trimmed copy of EDSs is initially stored. In some examples, such completion of a trimmed set of EDSs to generate a full copy set of EDSs may be made later when DSN conditions may be more amendable to do so (e.g., less traffic, period of lower activity, freed up processing resources, etc.). In addition, note that as certain versions of EDSs get updated (e.g., when the information dispersal algorithm (IDA), or original version of EDSs, or baseline set of EDSs, etc. gets updated), then other versions (e.g., copies of those EDSs, trimmed copies of those EDSs, etc.) can be updated appropriately in accordance with the various operations and conditions as described herein. This disclosure presents a novel means by which various sets of EDSs including copies and/or trimmed copies of EDSs of a baseline set of EDSs can be synchronized in terms of version level among other characteristics. When one or more SUs store EDSs that are not of a current version, then that SU can be directed to perform by another SU and/or computing device or can perform independently a rebuild of those EDSs at the proper revision level and/or request such proper revision level EDSs from another one or more SUs that store the proper revision level of EDSs.

In some examples, when the data access request slice name compares unfavorably with the plurality of slice names, the computing device 12 or 16 generates the empty data access response that includes no EDS without accessing the HDD. In sonic examples, note that the computing device is located at a first premises that is remotely located from at least one storage unit (SU) of a plurality of storage units (SUs) within the DSN that distributedly store a set of EDSs that includes the EDS associated with the data object. Note that the computing device 12 or 16 may be any type of devices including a storage unit (SU) within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

Figure 12:
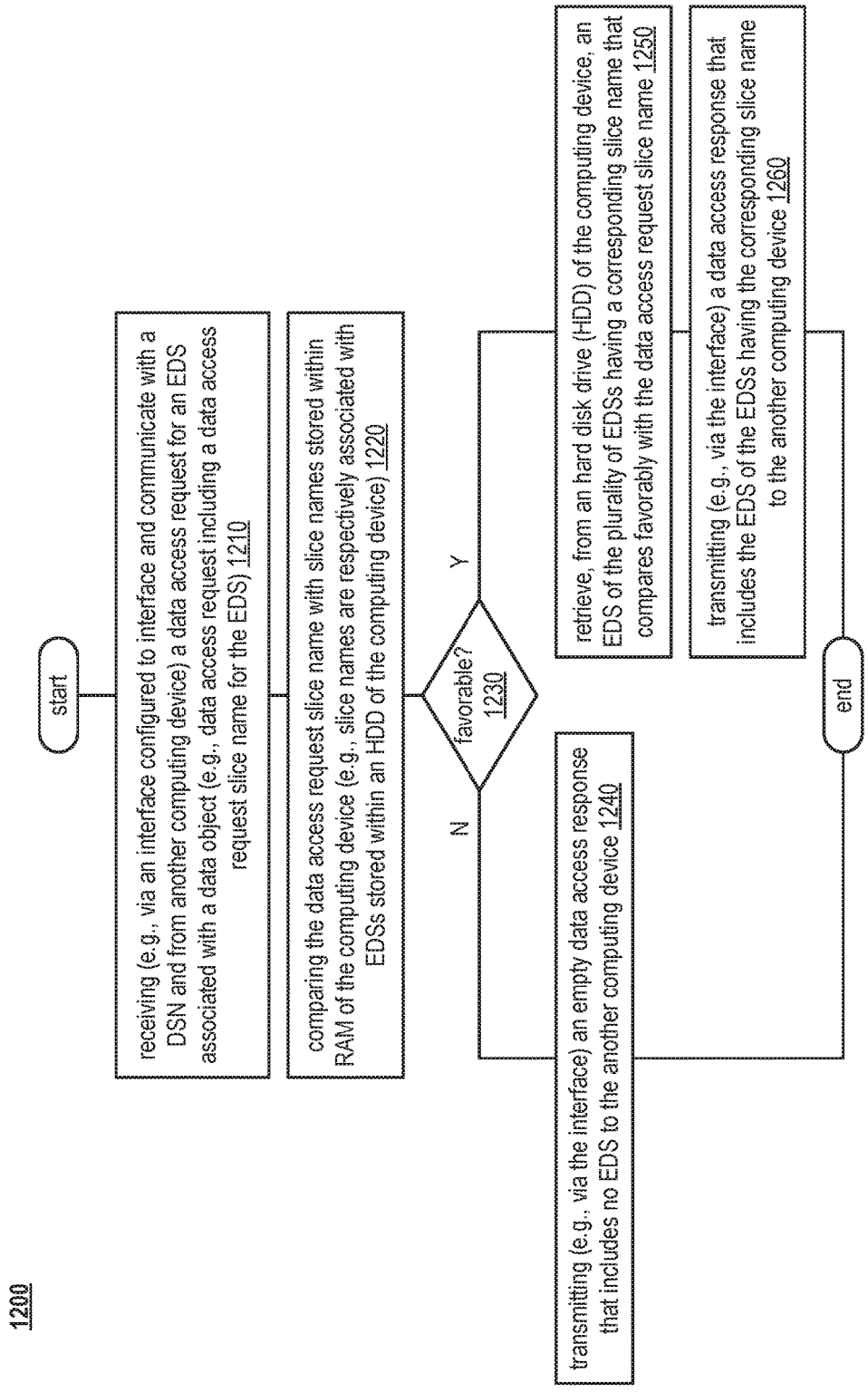
FIG. 12 is a diagram illustrating an embodiment of a method for execution by one or more computing devices in accordance with the present invention.

FIG. 12 is a diagram illustrating an embodiment of a method 1200 for execution by one or more computing devices in accordance with the present invention.

The method 1200 begins in step 1210 by receiving (e.g., via an interface configured to interface and communicate with a dispersed storage network (DSN)) from another computing device a data access request for an encoded data slice (EDS) associated with a data object. Note that the data access request includes a data access request slice name for the EDS associated with the data object.

The method 1200 continues in step 1220 by comparing the data access request slice name with a plurality of slice names stored within random access memory (RAM) of the computing device. Note that the plurality of slice names are respectively associated with a plurality of encoded data slices (EDSs) stored within the HDD.

The method 1200 then operates in step 1230 by determining whether the data access request slice name compares favorably or unfavorably with the plurality of slice names.

When the data access request slice name compares unfavorably with the plurality of slice names, the method 1200 then continues in step 1240 by transmitting via the interface an empty data access response that includes no EDS to the other computing device. Alternatively, when the data access request slice name compares favorably with at least one of the plurality of slice names, the method 1200 then continues in step 1250 by retrieving, from an hard disk drive (HDD) of the computing device, an EDS of the plurality of EDSs having a corresponding slice name that compares favorably with the data access request slice name. Then, the method 1200 then continues in step 1260 by transmitting via the interface a data access response that includes the EDS of the plurality of EDSs having the corresponding slice name to the other computing device.

When a dispersed storage (DS) unit has fast-access memory devices available, but with insufficient capacity to store all slices, it may use those fast-access memory devices to store slice names and revisions. This enables rapid responses to be generated for listing requests, check requests, and read requests for slices which do not exist. The DS unit, upon receiving a read request, will first check the fast-access memory device to determine the list of revisions which it stores for the requested slice name. If it determines that no such revisions are held on this DS unit, it can immediately return an empty read response without having to incur any IO to the memory devices for which the input/output (I/O) operations and processing may be expensive (e.g., in terms of speed, latency, etc.). The capability to efficiently handle reads for non-existent slices is important to a number of features, including Trimmed Writes, Target Widths, information dispersal algorithm (IDA)+Copy, and other situations. Fast check responses (e.g., very quickly provided response(s) from a device based on that device making a determination of status of EDS(s) stored therein by accessing information stored in fast memory indicating whether the requested EDS(s) and/or appropriate revision level(s) are stored therein) are useful for guaranteeing consistency and for meeting Read Threshold cheaply, while fast list request responses aid in rebuild scanning, reallocation, rebalancing, and synching between mirrored vault operations.

In general, there can be many operations performed within a DSN without needing to read an actual EDS. As such, the slice name(s) may be implemented in fast access memory (e.g., solid state, RAM, etc. memory vs. hard disk drive (HDD) memory). As such, the computing device can respond much more quickly by using slice names and appropriate revision level before accessing the actual storage medium (e.g., HDD) and getting the actual data (e.g., EDS(s)).

For example, each computing device and/or SU can be implemented to have a substantial amount of fast memory (e.g., RAM, solid state memory, etc.). There is a dividing line between RAM and HDDs within the computing device and/or SU. For example, the computing device and/or SU includes RAM that is used for processing, but then the computing device and/or SU also uses solid state for storage of slice names as well. The computing device and/or SU includes a mapping of where, for each of the slices, are physically stored the slice names and where the actual slices are stored in the device (e.g., in the HDD). As such, the computing device and/or SU includes 2 types of memory within the device (e.g., fast memory such as RAM, solid state memory, etc. and memory such as HDD). The computing device and/or SU puts the slice names (and revision numbers) in the fast memory and the actual data in the HDD. The computing device and/or SU can respond immediately to any data access requests if does not have the data without having to check or access the HDD by checking the slice names in the fast memory such as RAM, solid state memory, etc. In addition, note that the computing device and/or SU may also bifurcate the processing such that the computing device and/or SU could have implemented dedicated processing for messaging requests, etc. and then additional processing (and hardware) to access the actual data (input/output requests).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines, In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed storage network (DSN);
memory that stores operational instructions, wherein the memory includes random access memory (RAM) and a hard disk drive (HDD); and
a processing module operably coupled to the interface and to the memory, wherein the processing module, when operable within the computing device based on the operational instructions, is configured to:
receive from another computing device a data access request for an encoded data slice (EDS) associated with a data object, wherein the data access request includes a data access request slice name for the EDS associated with the data object;
compare the data access request slice name with a plurality of slice names stored within the RAM, wherein the plurality of slice names are respectively associated with a plurality of encoded data slices (EDSs) stored within the HDD;
when the data access request slice name compares unfavorably with the plurality of slice names, transmit an empty data access response that includes no EDS to the another computing device;
when the data access request slice name compares favorably with at least one of the plurality of slice names:
retrieve, from the HDD, an EDS of the plurality of EDSs having a corresponding slice name that compares favorably with the data access request slice name; and
transmit a data access response that includes the EDS of the plurality of EDSs having the corresponding slice name to the another computing device.

2. The computing device of claim 1, wherein the data object is segmented into a plurality of data segments, wherein a data segment of the plurality of data segments is dispersed error encoded in accordance with dispersed error encoding parameters to produce a set of encoded data slices (EDSs), wherein each EDS of the set of EDSs having a respective slice name, wherein the set of EDSs are distributedly stored among a plurality of storage units (SUs) within the DSN, wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN.

3. The computing device of claim 1, wherein the processing module, when operable within the computing device based on the operational instructions, is further configured to:
compare a revision level for the EDS associated with the data object that is included within the data access request to a plurality of revision levels stored within the RAM, wherein the plurality of revision levels are associated respectively with the plurality of slice names stored within the RAM;
when the data access request slice name compares unfavorably with the plurality of slice names and when the revision level for the EDS associated with the data object compares unfavorably with the plurality of revision levels, transmit the empty data access response to the another computing device;
when the data access request slice name compares favorably with the plurality of slice names and when the revision level for the EDS associated with the data object compares unfavorably with the plurality of revision levels, transmit the empty data access response to the another computing device;
when the data access request slice name compares favorably with at least one of the plurality of slice names and when the revision level for the EDS associated with the data object compares favorably with at least one of the plurality of revision levels:
retrieve, from the HDD, the EDS of the plurality of EDSs having the corresponding slice name that compares favorably with the data access request slice name and a corresponding revision level that compares favorably with the revision level for the EDS associated with the data object; and
transmit the data access response that includes the EDS of the plurality of EDSs having the corresponding slice name and the corresponding revision level that compares favorably with the revision level for the EDS associated with the data object to the another computing device.

4. The computing device of claim 1, wherein the data access request for the EDS associated with the data object is based on at least one of:
a check request involving the EDS associated with the data object;
a read request involving the EDS associated with the data object;
a write request involving the EDS associated with the data object;
a rebuild request involving the EDS associated with the data object;
a rebuild scanning request involving the EDS associated with the data object;
a reallocation request involving the EDS associated with the data object;
a rebalancing request involving the EDS associated with the data object;
a synchronization request between mirrored vault operations involving the EDS associated with the data object; or
a trimmed write request involving the EDS associated with the data object based on fewer than all of a set of encoded data slices (EDSs) generated when the data object is segmented into a plurality of data segments and a data segment of the plurality of data segments is dispersed error encoded in accordance with dispersed error encoding parameters to produce the set of EDSs.

5. The computing device of claim 1, wherein the processing module, when operable within the computing device based on the operational instructions, is further configured to:
when the data access request slice name compares unfavorably with the plurality of slice names, generate the empty data access response that includes no EDS without accessing the HDD.

6. The computing device of claim 1 wherein the computing device is located at a first premises that is remotely located from at least one storage unit (SU) of a plurality of storage units (SUs) within the DSN that distributedly store a set of EDSs that includes the EDS associated with the data object.

7. The computing device of claim 1 further comprising:
a storage unit (SU) within the DSN, a wireless smart phone, a laptop, a tablet, a personal computers (PC), a work station, or a video game device.

8. The computing device of claim 1, wherein the DSN includes at least one of a wireless communication system, a wire lined communication systems, a non-public intranet system, a public internet system, a local area network (LAN), or a wide area network (WAN).

9. A computing device comprising:
an interface configured to interface and communicate with a dispersed storage network (DSN);
memory that stores operational instructions, wherein the memory includes random access memory (RAM) and a hard disk drive (HDD); and
a processing module operably coupled to the interface and to the memory, wherein the processing module, when operable within the computing device based on the operational instructions, is configured to:
receive from another computing device a data access request for an encoded data slice (EDS) associated with a data object, wherein the data access request includes a data access request slice name for the EDS associated with the data object, wherein the data object is segmented into a plurality of data segments, wherein a data segment of the plurality of data segments is dispersed error encoded in accordance with dispersed error encoding parameters to produce a set of encoded data slices (EDSs), wherein each EDS of the set of EDS having a respective slice name, wherein the set of EDSs are distributedly stored among a plurality of storage units (SUs) within the DSN, wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN;
compare the data access request slice name with a plurality of slice names stored within the RAM, wherein the plurality of slice names are respectively associated with a plurality of encoded data slices (EDSs) stored within the HDD;
when the data access request slice name compares unfavorably with the plurality of slice names:
generate an empty data access response that includes no EDS without accessing the HDD; and
transmit the empty data access response that includes no EDS to the another computing device;
when the data access request slice name compares favorably with at least one of the plurality of slice names:
retrieve, from the HDD, an EDS of the plurality of EDSs having a corresponding slice name that compares favorably with the data access request slice name; and
transmit a data access response that includes the EDS of the plurality of EDSs having the corresponding slice name to the another computing device.

10. The computing device of claim 9, wherein the processing module, when operable within the computing device based on the operational instructions, is further configured to:
compare a revision level for the EDS associated with the data object that is included within the data access request to a plurality of revision levels stored within the RAM, wherein the plurality of revision levels are associated respectively with the plurality of slice names stored within the RAM;
when the data access request slice name compares unfavorably with the plurality of slice names and when the revision level for the EDS associated with the data object compares unfavorably with the plurality of revision levels, transmit the empty data access response to the another computing device;
when the data access request slice name compares favorably with the plurality of slice names and when the revision level for the EDS associated with the data object compares unfavorably with the plurality of revision levels, transmit the empty data access response to the another computing device;
when the data access request slice name compares favorably with at least one of the plurality of slice names and when the revision level for the EDS associated with the data object compares favorably with at least one of the plurality of revision levels:
retrieve, from the HDD, the EDS of the plurality of EDSs having the corresponding slice name that compares favorably with the data access request slice name and a corresponding revision level that compares favorably with the revision level for the EDS associated with the data object; and
transmit the data access response that includes the EDS of the plurality of EDSs having the corresponding slice name and the corresponding revision level that compares favorably with the revision level for the EDS associated with the data object to the another computing device.

11. The computing device of claim 9, wherein the data access request for the EDS associated with the data object is based on at least one of:
a check request involving the EDS associated with the data object;
a read request involving the EDS associated with the data object;
a write request involving the EDS associated with the data object;
a rebuild request involving the EDS associated with the data object;
a rebuild scanning request involving the EDS associated with the data object;
a reallocation request involving the EDS associated with the data object;

a rebalancing request involving the EDS associated with the data object;

a synchronization request between mirrored vault operations involving the EDS associated with the data object; or a trimmed write request involving the EDS associated with the data object based on fewer than all of a set of encoded data slices (EDSs) generated when the data object is segmented into a plurality of data segments and a data segment of the plurality of data segments is dispersed error encoded in accordance with dispersed error encoding parameters to produce the set of EDSs.

12. The computing device of claim 9 further comprising:
a SU of the plurality of SUs within the DSN, a wireless smart phone, a laptop, a tablet, a personal computers (PC), a work station, or a video game device.

13. The computing device of claim 9, wherein the DSN includes at least one of a wireless communication system, a wire lined communication systems, a non-public intranet system, a public internet system, a local area network (LAN), or a wide area network (WAN).

14. A method for execution by a computing device, the method comprising:
receiving, via an interface configured to interface and communicate with a dispersed storage network (DSN), from another computing device a data access request for an encoded data slice (EDS) associated with a data object, wherein the data access request includes a data access request slice name for the EDS associated with the data object;

comparing the data access request slice name with a plurality of slice names stored within random access memory (RAM) of the computing device, wherein the plurality of slice names are respectively associated with a plurality of encoded data slices (EDSs) stored within the HDD;

when the data access request slice name compares unfavorably with the plurality of slice names, transmitting via the interface an empty data access response that includes no EDS to the another computing device;

when the data access request slice name compares favorably with at least one of the plurality of slice names:
retrieving, from an hard disk drive (HDD) of the computing device, an EDS of the plurality of EDSs having a corresponding slice name that compares favorably with the data access request slice name; and transmitting via the interface a data access response that includes the EDS of the plurality of EDSs having the corresponding slice name to the another computing device.

15. The method of claim 14, wherein the data object is segmented into a plurality of data segments, wherein a data segment of the plurality of data segments is dispersed error encoded in accordance with dispersed error encoding parameters to produce a set of encoded data slices (EDSs), wherein each EDS of the set of EDS having a respective slice name, wherein the set of EDSs are distributedly stored among a plurality of storage units (SUs) within the DSN, wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the USN.

16. The method of claim 14 further comprising:
comparing a revision level for the EDS associated with the data object that is included within the data access request to a plurality of revision levels stored within the RAM, wherein the plurality of revision levels are associated respectively with the plurality of slice names stored within the RAM;

when the data access request slice name compares unfavorably with the plurality of slice names and when the revision level for the EDS associated with the data object compares unfavorably with the plurality of revision levels, transmitting via the interface the empty data access response to the another computing device;

when the data access request slice name compares favorably with the plurality of slice names and when the revision level for the EDS associated with the data object compares unfavorably with the plurality of revision levels, transmitting via the interface the empty data access response to the another computing device;

when the data access request slice name compares favorably with at least one of the plurality of slice names and when the revision level for the EDS associated with the data object compares favorably with at least one of the plurality of revision levels:
retrieving, from the HDD, the EDS of the plurality of EDSs having the corresponding slice name that compares favorably with the data access request slice name and a corresponding revision level that compares favorably with the revision level for the EDS associated with the data object; and transmitting via the interface the data access response that includes the EDS of the plurality of EDSs having the corresponding slice name and the corresponding revision level that compares favorably with the revision level for the EDS associated with the data object to the another computing device.

17. The method of claim 14, wherein the data access request for the EDS associated with the data object is based on at least one of:
a check request involving the EDS associated with the data object;

a read request involving the EDS associated with the data object;

a write request involving the EDS associated with the data object;

a rebuild request involving the EDS associated with the data object;

a rebuild scanning request involving the EDS associated with the data object;

a reallocation request involving the EDS associated with the data object;

a rebalancing request involving the EDS associated with the data object;

a synchronization request between mirrored vault operations involving the EDS associated with the data object; or a trimmed write request involving the EDS associated with the data object based on fewer than all of a set of encoded data slices (EDSs) generated when the data object is segmented into a plurality of data segments and a data segment of the plurality of data segments is dispersed error encoded in accordance with dispersed error encoding parameters to produce the set of EDSs.

18. The method of claim 14 further comprising:
when the data access request slice name compares unfavorably with the plurality of slice names, generating the empty data access response that includes no EDS without accessing the HDD.

19. The method of claim 14, wherein the computing device includes a storage unit (SU) within the DSN, a wireless smart phone, a laptop, a tablet, a personal computers (PC), a work station, or a video game device.

20. The method of claim 14, wherein the DSN includes at least one of a wireless communication system, a wire lined communication systems, a non-public intranet system, a public Internet system, a local area network (LAN), or a wide area network (WAN).

* * * * *